US009450805B2

United States Patent
Cvijetic et al.

(10) Patent No.: US 9,450,805 B2
(45) Date of Patent: Sep. 20, 2016

(54) GENERIC CENTRALIZED ARCHITECTURE FOR SOFTWARE-DEFINED NETWORKING WITH LOW LATENCY ONE-WAY BYPASS COMMUNICATION

(71) Applicant: NEC Laboratories America, Inc., Princeton, NJ (US)

(72) Inventors: Neda Cvijetic, Plainsboro, NJ (US); Ankitkumar Patel, Monmouth Junction, NJ (US); Philip Nan Ji, Plainsboro, NJ (US); Ting Wang, West Windsor, NJ (US); Maria Ioanna Angelou, Paraskevi (GR)

(73) Assignee: NEC Corporation (JP)

( * ) Notice: Subject to any disclaimer, the term of this patent is extended or adjusted under 35 U.S.C. 154(b) by 519 days.

(21) Appl. No.: 14/044,177

(22) Filed: Oct. 2, 2013

(65) Prior Publication Data

US 2014/0095685 A1 Apr. 3, 2014

Related U.S. Application Data

(60) Provisional application No. 61/709,262, filed on Oct. 3, 2012.

(51) Int. Cl.
    *G06F 15/173* (2006.01)
    *H04L 12/24* (2006.01)
    *H04L 12/721* (2013.01)
    *H04L 12/717* (2013.01)

(52) U.S. Cl.
    CPC ............. *H04L 41/00* (2013.01); *H04L 41/022* (2013.01); *H04L 41/04* (2013.01); *H04L 41/044* (2013.01); *H04L 41/12* (2013.01); *H04L 45/38* (2013.01); *H04L 45/42* (2013.01)

(58) Field of Classification Search
    CPC ........................................................ H04L 45/38
    USPC ................ 709/223, 224, 226, 238, 244, 220
    See application file for complete search history.

(56) References Cited

U.S. PATENT DOCUMENTS

2005/0069314 A1    3/2005   De Patre et al.

FOREIGN PATENT DOCUMENTS

EP          2487844 A1    8/2012

OTHER PUBLICATIONS

Das et al. "Unifying Packet and Circuit Switched Networks with OpenFlow" Stanford University, Dec. 2009, 10 pages.*

(Continued)

*Primary Examiner* — David Lazaro
(74) *Attorney, Agent, or Firm* — Joseph Kolodka

(57) ABSTRACT

A generic centralized, software-defined networking configuration for connecting network is defined as a generic multi-layer topology network entities interconnected either vertically or horizontally regardless of the employed network topology/graph). This centralized configuration enables establishment of a connection between any two networking entities by 1) bypassing intermediate protocol layers and 2) eliminating any handshaking between peer elements of the same layer. The centralized software-defined controller notifies in parallel all involved network entities along a connection path to take all necessary actions (i.e. reconfiguration) to establish the new connection. The centralized controller has authority to control only entities that are software-defined SD.

14 Claims, 3 Drawing Sheets

(56) References Cited

OTHER PUBLICATIONS

Cvijetic, N et al., "Defining Optical Software-Defined Networks (SDN): From a compilation of demos to network model synthesis", Optical Fiber Communication Conference and exposition and the National Fiber Optic Engineers Conference (OFC/NFOEC), 2013, IEEE, Mar. 17, 2013, pp. 1-3, XP032679189, ISBN: 978-1-4799-0457-0.
Kwangtae, J. et al., "QoS-aware Network Operating System from software defined Networking with Generalized OpenFlows", 2012 IEEE Network Operations and Management Symposium, Apr. 1, 2012, pp. 1167-1174, XP055054272, ISBN: 978-1-46-730268-5.
Saurav Das, "PAC-C: A unified control architecture for packet and circuit network convurgence", Jun. 20, 2012, XP055234588, Stanford, USA, http://yuba.stanford.edu/~sd2/thesis_saurav_das_pdf, pp. 3-119, pp. 218-239.
Dongzu Zhang et aL, "Experimental demonstration of OBS/WSON multi-layer optical switched networks with an OpenFlow-based unified control plane", Optical Network Design and Modeling (ONDM), 2012 16th International Conference on, IEEE, Apr. 17, 2012, pp. 1-6, XP032448926.
Giorgetti A et al., "OpenFlow and Pce architectures in wavelength switched optical networks", Optical Network Design and Modeling (ONDM), 2012 16th International Conference on IEEE, Apr. 17, 2012, pp. 1-6, XP032448915.
Lei Liu et al., "First field trial of an OpenFlow-based unified control plane for multi-layer multi-granularity optical networks", Optical Fiber Communication Conference and Exposition (OFC/NFOEC), 2012 and the National Fiber Optical Engineers Conference, IEEE, Mar. 3, 20212, pp. 1-3, XP032340166.

* cited by examiner $E = \{e_1, e_2, e_3, e_4, e_5, e_6\}, V = \{v_1, v_2\},$
$v_1 = \{e_1, e_3, e_5\}, v_2 = \{e_2, e_4, e_6\},$
$R(1,2) = 1, R(3,4) = 1, R(5,6) = 1,$
$k_1 = 1, k_2 = 2, k_3 = 1, k_4 = 2, k_5 = 1, k_6 = 2,$
$i_1 = 1, i_2 = 1, i_3 = 2, i_4 = 2, i_5 = 3, i_6 = 3,$
$t_1 = 5, t_2 = 5, t_3 = 5, t_4 = 5, t_5 = 5, t_6 = 5,$
$E_1 = \{e_1, e_2\}, E_2 = \{e_3, e_4\}, E_3 = \{e_5, e_6\},$
$sw_{e_1} = 1, sw_{e_2} = 1, sw_{e_3} = 1, sw_{e_4} = 1, sw_{e_5} = 1, sw_{e_6} = 0,$
$E' = \{e_1, e_2, e_3, e_4, e_5\}.$

GENERIC CENTRALIZED ARCHITECTURE FOR SOFTWARE-DEFINED NETWORKING WITH LOW LATENCY ONE-WAY BYPASS COMMUNICATION

This application claims the benefit of U.S. Provisional Application No. 61/709,262, filed Nov. 3, 2012, of which the contents are incorporated herein by reference.

BACKGROUND OF THE INVENTION

The present invention relates generally to optical systems and, more particularly, to a generic centralized architecture for software-defined networking with latency one-way bypass communication.

In conventional optical network architectures, a protocol stack is employed such that data flows up and down the networking protocol layers. This bidirectional communication occurs in terms of hops from one layer to the next (above or below), and data has to be processed by special interfaces at every intermediate level. This happens since every protocol has its own special role to play, but also has rules for carrying data/processing/forwarding data. A case in point is today's Internet which employs such a protocol stack with each of the half dozen or so protocols performing certain functions. However, since communication on the Internet is based on packet switching, each of these packets requires a series of data encapsulations that are performed by the protocol layers. The resulting multi-layer protocol configuration incurs processing and queuing delays at every intermediate step. Moreover, even beyond this specific context of packet-switched communication of the Internet, multiple hops generally translate to delay at every interfacing step, which can be prohibitive for emerging low-latency applications/services.

Several previous approaches have been proposed based on bypassing, or skipping, layers in the networking protocol stack in order to reduce latency. For example, Internet Protocol (IP) over Wavelength Division Multiplexing (WDM), or IPoWDM for short, is well-established concept where the IP layer lies directly above the WDM layer, skipping all intermediate layers. More recently, in another prior work, the authors exploited software-defined centralized network control using an OpenFlow-based type of solution to control optical crossconnects (OXCs), and compared this with a centralized generalized multiprotocol label switching (GMPLS)-based solution where handshaking between peer entities takes place so as to reserve the network resources. By enabling parallel centralized control, the OpenFlow-based solution showed superior performance. Finally, in another prior work, a field trial demonstration was performed showing that a communication path between the IP layer directly to the WDM layer and then again to the IP layer can be established in a software-defined way using Open-Flow to configure all elements regardless of the layer they belong to. Apart from unifying network elements from different layers this was also an example of layer bypassing (skipping of unnecessary intermediate interfacing steps).

Accordingly, there is a need for a generic centralized, software-defined networking architecture for connecting network entities that overcomes the protocol and topology specific limitations of previous work

BRIEF SUMMARY OF THE INVENTION

In an aspect of the present invention, a centralized, software-defined networking configuration for connecting network entities includes a network configuration of network entities connected vertically across layers and horizontally on the same layer, particular ones on the network entities being software defined SD entities and remaining network entities being non-SD entities and some non-SD entities being connected to at least one of the SD entities; and a centralized software-defined controller for controlling network entities under its authority, non-SD entities being uncontrollable by the controller, responsive to a demand for a communication path between two entities, the controller informs all involved entities to act accordingly, controller being only responsible for a notification of the involved entities and the allocation of resources with the entities themselves being responsible for local implementation and configuration.

In a similar aspect of the present invention, a computer system configured with instructions for battery life management with diagnostic analytics includes combining an equivalent circuit model of a battery and an offline model capturing variation of circuit parameters of the battery, components of the equivalent circuit model depending on determined internal state of the battery and the parameters of the offline model taking into account the equivalent circuit model; employing actual operational data, in an online data operational mode, for capturing various modes of operation of the battery and different discharge rates to fit the parameters of the offline model; and using a completed analysis from above to enable the offline model to be used in an online phase to adjust estimates of the internal battery state as the battery is operating.

In a similar aspect of the invention, a computer implemented centralized, software-defined networking configuration for connecting network entities includes connecting a network configuration of network entities vertically across layers and horizontally on the same layer, particular ones on the network entities being software defined SD entities and remaining network entities being non-SD entities and some non-SD entities being connected to at least one of the SD entities; and controlling, via a centralized software-defined controller, network entities under its authority, non-SD entities being uncontrollable by the controller, responsive to a demand for a communication path between two entities, the controller informs all involved entities to act accordingly, controller being only responsible for a notification of the involved entities and the allocation of resources with the entities themselves being responsible for local implementation and configuration.

These and other advantages of the invention will be apparent to those of ordinary skill in the art by reference to the following detailed description and the accompanying drawings.

DETAILED DESCRIPTION

The invention is directed to the problem is solved by defining a generic centralized, software-defined networking architecture for connecting network entities that overcomes the protocol and topology specific limitations of previous work. In the proposed architecture, network entities are not pre-defined as part of a particular network segment (i.e. optical access/metro/core). Instead, the architecture is defined as a generic multi-layer topology in which network entities are interconnected either vertically (connection of entities between different layers) or horizontally (between peer elements of the same layer) regardless of the employed network topology/graph (i.e. mesh, tree, ring etc.). The main goal of this centralized architecture is to enable establishment of a connection between any two networking entities by 1) bypassing intermediate protocol layers and 2) eliminating any handshaking between peer elements of the same layer. The centralized software-defined controller notifies in parallel all involved network entities along a connection path to take all necessary actions (i.e. reconfiguration) to establish the new connection. However the centralized controller has the authority to control only the entities that support such software-enabled reconfigurability (i.e. are software-defined (SD). In that manner, the controller has knowledge and control of all entities that have installed the "app" (i.e. are SD) and can establish connections (flows) between them as long as there are consecutive entities that are SD either horizontally or vertically. In this way, an arbitrary multi-layer network can be transformed to a low-latency single-layer architecture in a software-defined way. As a result, data can bypass unnecessary layers transparently to what the exact underlying layers are, as if there is simply a vertical pipe that allows it to cut-through the network without delay.

Figure 1:
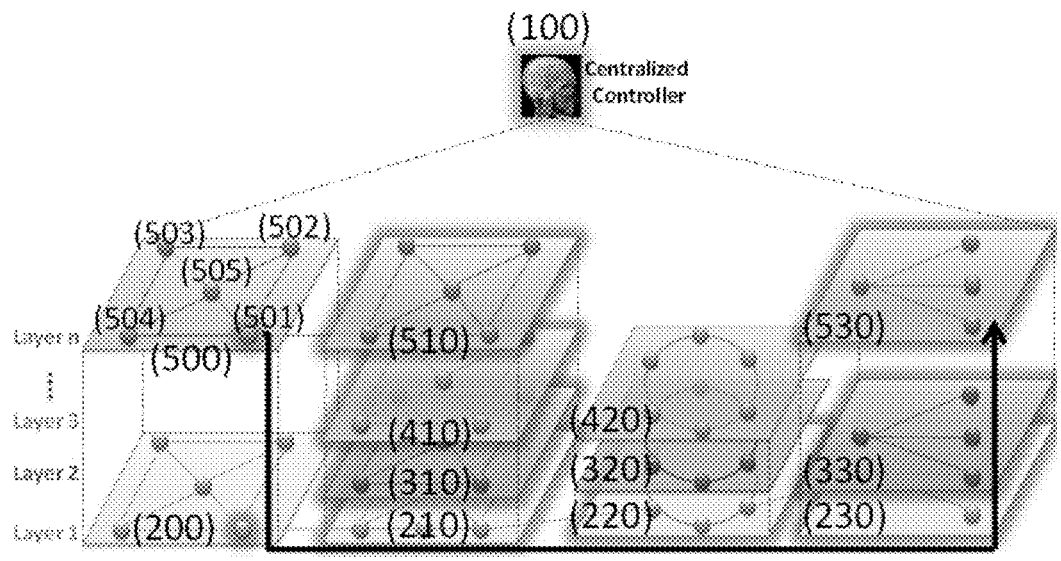
FIG. 1 is a diagram of centralized software-defined one-way bypass architecture, wherein only the entities that are software-defined, as noted in the specification, can be controlled by the centralized controller, in accordance with the invention.

FIG. 1 illustrates the proposed architecture. As mentioned above, the architecture relies on a centralized software-defined controller (100) whose role is to act as the "brain" of the entire set of network entities under its authority: (210-510) in FIG. 1. Upon demand for a communication path between two entities, the controller informs all involved entities to act accordingly. It is noted that the controller is only responsible for the notification of the involved entities and the allocation of resources, yet the entities themselves are responsible for the local implementation/configuration. However the controller has authority only on the entities that are software-defined (SD)—for example, only the glowing elements of FIG. 1, i.e. (201), (501), (210)-(510), (220) and (230)-(530) are SD and can be controlled by (100). There may also be entities connected vertically (across layers) or horizontally (on the same layer) to a SD entity that cannot be controlled by the controller, as shown by the non-glowing entities and layers of entities in FIG. 1—i.e. (502)-(504), (320) and (420).

Figure 2:
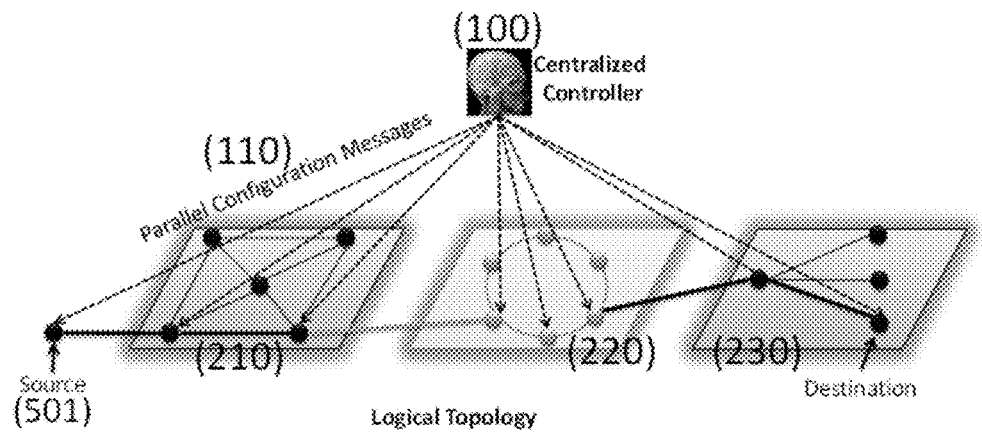
FIG. 2 is diagram of a logical single-layer topology of the inventive architecture wherein upon the establishment of a communication path the centralized controller notifies in parallel all involved entities and there is no need for handshaking communication and the communication establishment is seamless across layers and domains whereby, consequently, the actual topology of FIG. 1 transforms to a logical one consisting of only the network entities that are software-defined, in accordance with the invention.

The controller (100) keeps track of all the network entities that are SD and can establish communication paths between them as long as they are all connected to each other either vertically or horizontally. (In other words, there cannot be isolated islands of network entities.). As also illustrated in FIG. 1, in a given network segment and layer, there can be a mix of SD and non-SD network entities (e.g. (500) where only (501) is SD while other entities on layer n in this network segment are non-SD). In other network segments, all entities on all layers can be SD (e.g. the middle segment with all SD entities in layers (210)-(510) in FIG. 1). Finally, in still other network segments, SD entities can exist on only one layer (e.g. the lowest layer (220) in the right-most segment of FIG. 1). Naturally the centralized controller establishes communication paths that begin, traverse and end inside the domain of the controller (i.e. all vertical/horizontal entities that form a connected graph). In the case where the data flowing inside the controller's domain actually need to reach an entity outside, then the conventional protocols and technologies would take over to bring the data to their destination. The topology illustrated in FIG. 1 can thus be transformed in a software-defined way to the logical topology of FIG. 2, where only the "glowing" (i.e. SD) network entities are visible to the centralized controller (100) and communication takes place on the lowest SD-enabled layer: i.e. from (501) through (200) and (210), bypassing layers (310), (410) and (510), to a destination entity in (530). As shown in FIG. 2, the controller (100) sends parallel configuration messages (110) using out-of-band connections (e.g. through the Internet and the TCP protocol) to all the involved entities, which can then take immediate action such that there is no need for handshaking between peer entities. In turn, all the involved entities merely send an acknowledgment message to the centralized controller. Once all entities send such an acknowledgement a communication path is considered to be established.

In the logical topology of FIG. 2, the multiple layers (i.e. (501)-201), (210)-(510) and (230)-(530) in FIG. 1) virtually merge together and can be considered as one layer. This is the result of the software-defined bypass of the layers to reduce multi-layer processing delay. In a sense, the SD feature allows the controller to bypass multiple and old interfaces and technologies in order to establish uninterrupted communication paths between entities regardless of the network segment or layer to which they actually belong. The idea behind the fact that there may be entities that cannot be controlled by the centralized controller (are not SD) is that these entities may be "upgraded" and added to the controller's set of entities in an incremental manner.

Five categories of network entities are defined for this architecture:

A source entity (Tx).
A destination entity (Rx).
A source and destination entity (TR).
A cross-connecting entity (XC).
A cross-connecting entity with source/destination capability (Xtr).

Any network entity can only belong to one of these categories. Communication paths can then be established between the SD entities and can be initiated by any entity with source capability and terminated at any entity with destination capability. The centralized controller is responsible for the computation of the routes since it has complete knowledge of all the entities under its control and their traffic status.

The routing process abides in three very simple generic rules:
1) Communication paths take place in the lowest layer possible (therefore minimizing the vertical hops).
2) Communication paths traverse entities within the same layer end-to-end.
3) There is only one communication path between two entities of the same layer.

The inventive architecture is then formally defined as follows:

Parameters and Variables (1)

Let E be the set of entities in the entire network (regardless of the layer or segment).
Let V be the set of vectors that represent the stacks of entities.
Let K be the set of layers, K={1,2,3 ... }
Entity e is uniquely identified within the entire network, where $e \in E$, $e \in \mathbb{N}$ and $0 \le e \le |E|$.
Let $v_k$ be a vector that represents the vertical locations of entities such that $v_x(i)$ refers to the entity that is situated in vector k on layer i and $v_x(i+1)$ refers to the entity that is situated directly above $v_k(i)$, where $v_k \in V$, $k \in \mathbb{N}$, $0 \le k \le |V|$ and $i \in K$.
Links (horizontal logical or physical interconnections) are represented with a matrix $R \in \{0,1\}^{|E| \times |E|}$, where R(m, n)=1 if entity m is connected with entity n and R(m, n)=0 if they are not connected.
Let $k_e$ carry the vector id to which entity e belongs to.
Let $i_e$ carry the level (layer) of the entity, such that $v_k(i_e)=e$.
Let $E_i$ be the set of entities that belong to the same layer i, then $E_i = \{\forall e \in E: i_e = i\}$.
Let $t_e$ carry the type of the entity e, where $t_e \in \{1,2,3,4,5\}$ (1=source, 2=destination, 3=source/destination, 4=cross-connectingentity, 5=cross-connecting/source/destination).
Let $sw_e$ be a Boolean variable that signifies whether entity e is SD or not; $sw_e \in \{0,1\}$.
Let E' be the set of entities that are SD, then $E' = \{\forall e \in E$ and $e \le |E|: sw_e = 1\}$.
Let T be the traffic matrix then $T \in \{0,1\}^{|E| \times |E|}$, where T(s, d)=1 signifies a connection demand between entities s: $t_s \in \{1,3,5\}$ and d: $t_d \in \{2,4,5\}$.
Let $P_i$ be the set of paths that traverse layer i.
Let $i_{sd}$ be the layer of the path (s, d).
$p_{sdi}$ boolean variable, $p_{sdi}=1$ if a path is established between (s, d) pair in layer i.
Let $L_{sdi}$ be the set of links traversed by path (s, d) on layer i.
Let $E_{sdi}$ be the set of entities traversed by path (s, d) on layer i.
$x_{mn}^{sdi}$ boolean variable, $$x_{mn}^{sdi} = 1$$

if path (s, d) of layer i traverses link between entities (m, n).

Objective Function (2)

$$\min(\Sigma_{s,d \in E: s \ne d} i_{sd} + \Sigma_{s,d \in E: s \ne d} |E_{sdi}|);$$

i.e. find paths with the lowest layer possible and minimize their hops

Constraints (3)

$i_m = i_n \forall R(m, n)=1$, m, n $\in$ E; Links (horizontal interconnection are allowed only between entities of the same layer.
$p_{sdi} \le 1$; Only one path between entities s and d on layer i.
$E_{sdi} \subset L_i$; All entities traversed by a path need to be on the same layer.
$E_{sdi} \subset E'$; All entities traversed by a path need to be controlled by the centralized controller.
$sw_j = 1 \forall i_s \le i_j \le i_{sd}$: $k_s = k_j$; Layer bypass on the source side.
$sw_j = 1 \forall i_d \le i_j \le i_{sd}$: $k_j = k_d$; Layer bypass on the destination side.
$i_s = i_d \forall p_{sdi} \in P_i$; Source and destination entities s and d need to be on the same layer.

Figure 3:
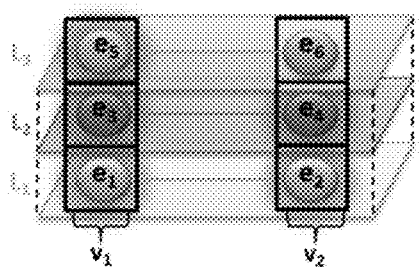
FIG. 3 is a diagram depicting a numerical example of the formal definition of the proposed network, in accordance with the invention.

To illustrate the practical usage of the formal parameter and variable definitions 1-19 of (1) above, a numerical example is shown in FIG. 3, for a three-layer network ($L_1$, $L_2$, $L_3$) of two protocol stacks ($v_1$, $v_2$) and six network entities ($e_1$-$e_5$), five of which are SD. The target communication path with the minimum number of hops can then be computed by the controller (100) by optimizing the objective function of (2) subject to the set of constraints (3) using well-known optimization algorithms. From FIGS. 1-3 and the formal definition of (1)-(3), it may be observed that the proposed centralized architecture is completely generic in terms of the actual functionality of every network entity or layer. In other words, it does not matter if a given network entity is an IP router or an optical receiver. The centralized software-defined one-way bypass architecture simply seeks to bypass as many intermediate protocols as possible and eliminate any handshaking communication between peer entities, regardless of what or where the exact underlying network entity may be.

Figure 4:
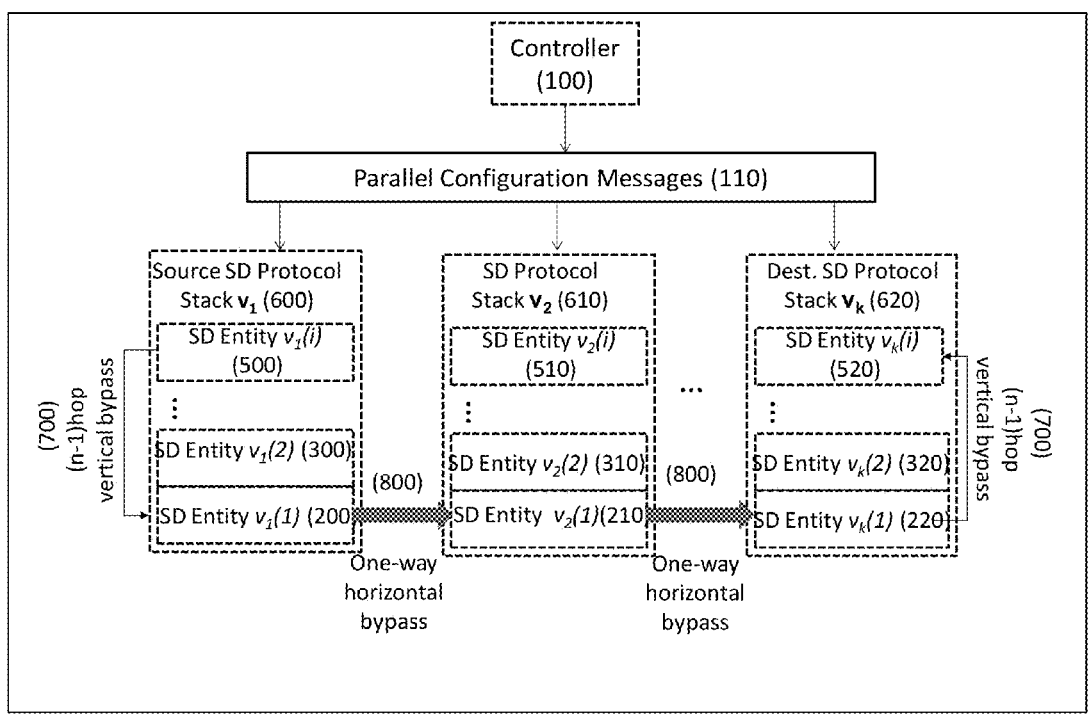
FIG. 4 is a high-level block diagram for the proposed software-defined bypass network architecture, in accordance with the invention.

FIG. 4 illustrates the broadest inventive features of the proposed architecture. As shown in FIG. 4, these consist of the centralized controller (100) and the software-defined protocol stacks, (600)-(620). The SD protocol stacks in turn consist of SD network entities (200)-(520), located at different layers in the stack. The communication path commands are issued by the controller (100) via parallel configuration messages (110), which may be implemented using arbitrary protocols (e.g. OpenFlow.) In a source SD protocol stack (600), commands from the controller (100) enable a vertical bypass of (i–1) hops (700) from the highest-layer SD network entity (500) to the lowest layer SD network entity (200), notably reducing processing delay/latency. Moreover, centralized commands from the controller (100) distributed in parallel (110) enable one-way bypasses (800) from the source protocol stack (600) to the destination protocol stack (620) by removing two-way handshaking between any two intermediate protocol stacks along the way (e.g. at intermediate protocol stack (610), for example.) Finally, because SD vertical bypass (700), communication from (600) to (620) via (610) is directly carried out using the lowest-layer network entities (200), (210), (220), without making an extraneous intermediate trips up the protocol stack. At the destination (620), another SD-enabled vertical bypass of (i–1) hops (700) is exploited to minimize the overall processing latency.

Figure 5:
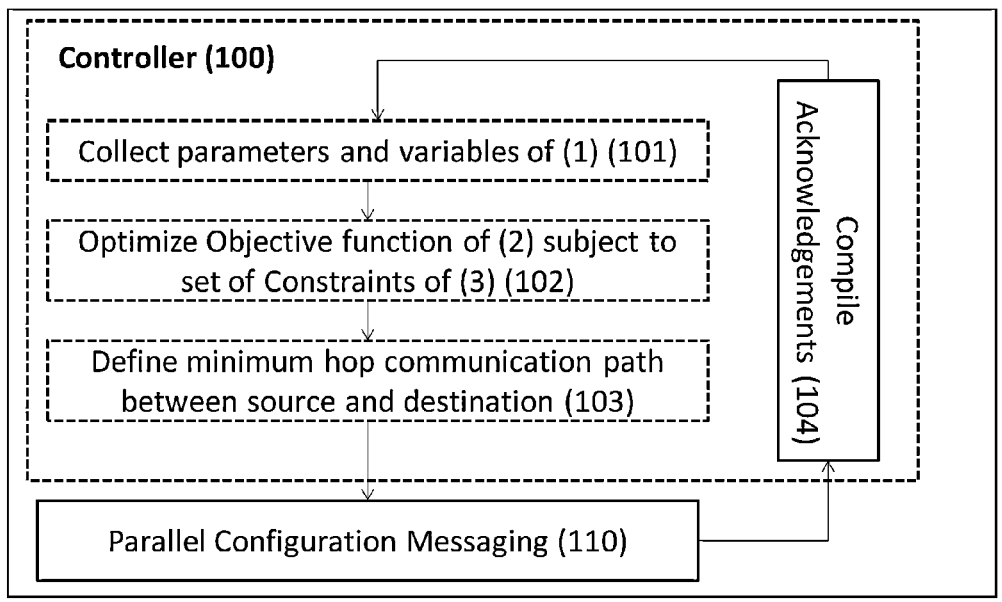
FIG. 5 is a detailed operational block diagram of the software-defined centralized controller (100), in accordance with the invention.

FIG. 5 illustrates the detailed operational principles of the SD centralized controller (100), which compiles and maintains a living list of all SD network entities under its control. This list of elements is stored by the controller (100) in the form of parameters and variables as listed in (1). After collecting this list (101), the controller carries out optimization of (2), the objective function for computing the minimum-hop (i.e. lowest latency) communication path (102). Based on the results of (102), the optimal communication path between a target SD source-destination entity pair is defined (103), with the resulting decision communicated in parallel to the SD network entities via generic parallelized configuration messaging (110). Following (110), the controller (100) awaits acknowledgement messages from the network entities (104), based on which it can proceed with new path computations and/or update the parameter/variable collection of (101).

The invention may be implemented in hardware, firmware or software, or a combination of the three. Where parts of the invention are implemented in a computer program, they may be executed on a programmable computer having a processor, a data storage system, volatile and non-volatile memory and/or storage elements, at least one input device and at least one output device.

Figure 6:
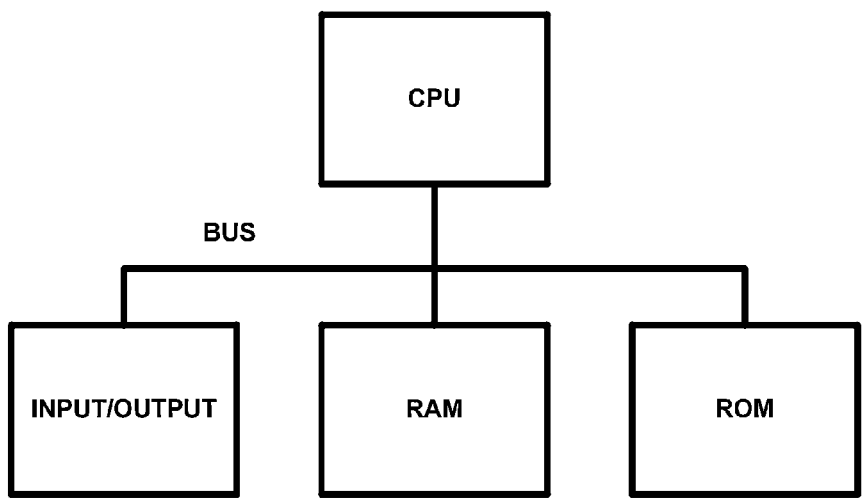
FIG. 6 is a diagram showing an exemplary computer to perform the inventive software-defined bypass network architecture, in accordance with the invention.

By way of example, a block diagram of a computer to support the system is discussed next in FIG. 6. The computer preferably includes a processor, random access memory (RAM), a program memory (preferably a writable read-only memory (ROM) such as a flash ROM) and an input/output (I/O) controller coupled by a CPU bus. The computer may optionally include a hard drive controller which is coupled to a hard disk and CPU bus. Hard disk may be used for storing application programs, such as the present invention, and data. Alternatively, application programs may be stored in RAM or ROM. I/O controller is coupled by means of an I/O bus to an I/O interface. I/O interface receives and transmits data in one of or combination of analog or digital form over one or a number of communication links such as a serial link, local area network, wireless link, optical link and parallel link. Optionally, a display, a keyboard and a pointing device (mouse) may also be connected to I/O bus. Alternatively, separate connections (separate buses) may be used for I/O interface, display, keyboard and pointing device. Programmable processing system may be preprogrammed or it may be programmed (and reprogrammed) by downloading a program from another source (e.g., a floppy disk, CD-ROM, or another computer).

Each computer program is tangibly stored in a machine-readable storage media or device (e.g., program memory or magnetic disk) readable by a general or special purpose programmable computer, for configuring and controlling operation of a computer when the storage media or device is read by the computer to perform the procedures described herein. The inventive system may also be considered to be embodied in a computer-readable storage medium, configured with a computer program, where the storage medium so configured causes a computer to operate in a specific and predefined manner to perform the functions described herein.

From the foregoing it can also be appreciated that the invention, unlike previous solutions, is not restricted to specific network segments or protocols (e.g. IPoWDM and core optical networks) but is applicable to arbitrary multi-layer networks that span over different segments. This can be attractive for operators looking to define low-latency optical metro/access networks for low latency applications (e.g. mobile backhaul, datacenters.) Moreover, the proposed solution can be directly applied in today's multi-layered, heterogeneous networks to cost-efficiently upgrade the existing infrastructure in a software-defined way. Such an attribute empowers operators to both unify their infrastructure via centralized hardware-transparent control and ultimately allow both shorter end-to-end delays for low latency services, as well as and ease of management to enable efficient network scaling. In short, the competitive/commercial advantages of the proposed solution can be summarized as follows: 1) Parallel network entities configuration that obviates the need for signaling or handshaking-type of communication between peer entities, and in this way, minimizes end-to-end delay; 2) Bypass of intermediate/extraneous layers and direct configuration of the network entities in the lowest layer possible so as to minimize delay, resource utilization and energy consumption; 3) Unification of all network elements regardless of the specific network segment or protocol layer for ease of management and efficient complexity scaling; 4) Simplification of current network architectures where a multiplicity of different technologies exists so as to raise the level of abstraction in existing heterogeneous multi-layer networks; 5) Smooth migration to the software-defined architecture where the existing infrastructure is software-upgraded in a cost-efficient, incremental manner.

The foregoing is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that those skilled in the art may implement various modifications without departing from the scope and spirit of the invention. Those skilled in the art could implement various other feature combinations without departing from the scope and spirit of the invention.

The invention claimed is:

1. A centralized, software-defined networking configuration for connecting network entities, the configuration comprising:

a network configuration of network entities connected vertically across layers and horizontally on the same layer, particular ones on the network entities being software defined SD entities and remaining network entities being non-SD entities and some non-SD entities being connected to at least one of the SD entities; and a centralized software-defined controller for controlling network entities, non-SD entities being uncontrollable by the controller, responsive to a demand for a communication path between two entities, the controller informs all involved entities to form the communication path, the controller being only responsible for a notification of the involved entities and the allocation of resources with the entities themselves being responsible for local implementation and configuration;

wherein the centralized controller sends parallel configuration messages using out-of-band connections, such as through the Internet and the TCP protocol, to all involved entities, which can take immediate action such that there is no need for handshaking between peer entities and in turn, all the involved entities merely send an acknowledgment message to the centralized controller, whereby once all entities send such an acknowledgement a communication path is considered to be established.

2. The networking configuration of claim 1, wherein the controller keeps track of all the SD network entities and can establish communication paths between them as long as they are all connected to each other either vertically or horizontally, the centralized controller establishing communication paths that begin, traverse and end inside a domain of the controller.

3. The networking configuration of claim 2, wherein data flowing inside a controller's domain actually needs to reach an entity outside the domain, and conventional protocols and technologies take over to bring the data to destination, the controller's domain being all vertical and horizontal entities that form a connected graph.

4. The network configuration of claim 1, further comprising software-defined SD protocol stacks, the SD protocol stacks including SD network entities located at different layers in a stack, communication path commands being issued by the controller over parallel configuration messages which may be implemented using arbitrary protocols.

5. The network configuration of claim 1, further comprising software defined SD protocol stacks receiving parallel configuration messages from the controller, the protocol stacks including a source SD protocol stack wherein centralized commands from the controller distributed in parallel enable one-way bypasses from the source SD protocol stack to a destination protocol stack by removing two-way handshaking between any two intermediate protocol stacks along the way.

6. The network configuration of claim 1, further comprising software defined SD protocol stacks receiving parallel configuration messages from the controller, the protocol stacks including a source SD protocol stack and a destination protocol stack wherein a SD vertical bypass communication is directly carried out using lowest-layer network entities without making extraneous intermediate trips up the protocol stack at the destination stack, and another SD enabled vertical bypass of hops is exploited to minimize the overall processing latency.

7. A centralized, software-defined networking configuration for connecting network entities, the configuration comprising:
a network configuration of network entities connected vertically across layers and horizontally on the same layer, particular ones on the network entities being software defined SD entities and remaining network entities being non-SD entities and some non-SD entities being connected to at least one of the SD entities;
a centralized software-defined controller for controlling network entities, non-SD entities being uncontrollable by the controller, responsive to a demand for a communication path between two entities, the controller informs all involved entities to form the communication path, the controller being only responsible for a notification of the involved entities and the allocation of resources with the entities themselves being responsible for local implementation and configuration; and
software defined SD protocol stacks receiving parallel configuration messages from the controller, the protocol stacks including a source SD protocol stack wherein commands from the controller enable a vertical bypass hops from a highest layer SD network entity to a lowest layer SD network entity thereby reducing processing delay or latency.

8. A computer implemented centralized, software-defined networking method for connecting network entities, the method comprising:
connecting a network configuration of network entities vertically across layers and horizontally on the same layer, particular ones on the network entities being software defined SD entities and remaining network entities being non-SD entities and some non-SD entities being connected to at least one of the SD entities;
controlling, via a centralized software-defined controller, network entities, non-SD entities being uncontrollable by the controller, responsive to a demand for a communication path between two entities, the controller informs all involved entities to form the communication path, the controller being only responsible for a notification of the involved entities and the allocation of resources with the entities themselves being responsible for local implementation and configuration;
wherein the centralized controller sends parallel configuration messages using out-of-band connections, such as through the Internet and the TCP protocol, to all involved entities, which can take immediate action such that there is no need for handshaking between peer entities and in turn, all the involved entities merely send an acknowledgment message to the centralized controller, whereby once all entities send such an acknowledgement a communication path is considered to be established.

9. The computer implemented method of claim 8, wherein the controller keeps track of all the SD network entities and can establish communication paths between them as long as they are all connected to each other either vertically or horizontally, the centralized controller establishing communication paths that begin, traverse and end inside a domain of the controller.

10. The computer implemented method of claim 9, wherein data flowing inside a controller's domain actually needs to reach an entity outside the domain, and conventional protocols and technologies take over to bring the data to destination, the controller's domain being all vertical and horizontal entities that form a connected graph.

11. The computer implemented method of claim 8, further comprising software-defined SD protocol stacks, the SD protocol stacks including SD network entities located at different layers in a stack, communication path commands being issued by the controller over parallel configuration messages which may be implemented using arbitrary protocols.

12. The computer implemented method of claim 8, further comprising software defined SD protocol stacks receiving parallel configuration messages from the controller, the protocol stacks including a source SD protocol stack wherein commands from the controller enable a vertical bypass hops from a highest layer SD network entity to a lowest layer SD network entity thereby reducing processing delay or latency.

13. The computer implemented method of claim 8, further comprising software defined SD protocol stacks receiving parallel configuration messages from the controller, the protocol stacks including a source SD protocol stack wherein centralized commands from the controller distributed in parallel enable one-way bypasses from the source SD protocol stack to a destination protocol stack by removing two-way handshaking between any two intermediate protocol stacks along the way.

14. The computer implemented method of claim 8, further comprising software defined SD protocol stacks receiving parallel configuration messages from the controller, the protocol stacks including a source SD protocol stack and a destination protocol stack wherein a SD vertical bypass communication is directly carried out using lowest-layer network entities without making extraneous intermediate trips up the protocol stack at the destination stack, and another SD enabled vertical bypass of hops is exploited to minimize the overall processing latency.

* * * * *